United States Patent [19]
Johnson et al.

[11] Patent Number: 5,955,199
[45] Date of Patent: Sep. 21, 1999

[54] IMINE-CONTAINING CURATIVE FOR TWO COMPONENT POLYURETHANE STRUCTURAL ADHESIVES

[75] Inventors: Randy Allen Johnson, Hilliard; Timothy Allen Tufts, Powell, both of Ohio

[73] Assignee: Ashland Inc., Covington, Ky.

[21] Appl. No.: 08/939,022

[22] Filed: Sep. 26, 1997

[51] Int. Cl.[6] ............................. B32B 27/40; B32B 27/36
[52] U.S. Cl. .................................... 428/423.1; 428/423.7
[58] Field of Search ............................... 428/423.1, 423.7

[56] References Cited

U.S. PATENT DOCUMENTS

| | | | |
|---|---|---|---|
| 3,420,800 | 1/1969 | Haggis et al. | 528/59 |
| 3,567,692 | 3/1971 | Haggis et al. | 528/64 |
| 3,932,357 | 1/1976 | Schmitt et al. | 528/64 |
| 4,108,842 | 8/1978 | Konig et al. | 528/61 |
| 4,513,112 | 4/1985 | Ernst et al. | 524/590 |
| 4,554,299 | 11/1985 | Liggett | 523/466 |
| 4,579,890 | 4/1986 | Domeler | 523/512 |
| 4,728,710 | 3/1988 | Goel | 528/48 |
| 4,923,756 | 5/1990 | Chung et al. | 428/423.7 |
| 5,002,806 | 3/1991 | Chung | 427/385.5 |
| 5,175,228 | 12/1992 | Wang et al. | 528/48 |
| 5,214,086 | 5/1993 | Mormille et al. | 524/237 |
| 5,228,797 | 7/1993 | Khalil et al. | 524/872 |
| 5,340,901 | 8/1994 | Wang | 528/60 |
| 5,412,056 | 5/1995 | Zwiener et al. | 528/73 |
| 5,489,704 | 2/1996 | Squiller et al. | 560/35 |
| 5,523,376 | 6/1996 | Hicks et al. | 528/44 |

FOREIGN PATENT DOCUMENTS

| | | |
|---|---|---|
| 2120860 | 4/1994 | Canada . |
| 0149765 | 11/1984 | European Pat. Off. . |
| 0659791 A1 | 12/1994 | European Pat. Off. . |
| 2630013 | 7/1976 | Germany . |
| 4006537 | 3/1990 | Germany . |
| WO95/11933 | 10/1994 | WIPO . |

OTHER PUBLICATIONS

PMSE 1986, 55, *New Developments in Polyketimine–Polyisocyanate Chemistry and Their Application*, M. Block and R. Halpaap of Bayer AG, Leverkusen, Germany.

*Primary Examiner*—D. S. Nakarani
*Attorney, Agent, or Firm*—Mary E. PIcken; Martin Connaughton

[57] ABSTRACT

This invention is the addition of an polyaldimine or polyketimine to the curative component of a two part polyurethane structural adhesive for bonding car, boat and truck parts.

9 Claims, No Drawings

IMINE-CONTAINING CURATIVE FOR TWO COMPONENT POLYURETHANE STRUCTURAL ADHESIVES

This invention relates to a new imine-containing curative used to cure a polyisocyanate prepolymer component giving a structural adhesive which improves adhesion strength and percent fiber tear of bonded fiber-reinforced plastic parts for cars, trucks and boats. In addition, the imine modification improved the robustness of the primeness polyurethane structural adhesive as determined by outstanding adhesion for sheet molding compound bonded in humid as well as dry environments.

BACKGROUND OF THE INVENTION

Two-component, primeness polyurethane structural adhesives have been used for many years in industry to adhere substrates such as fiberglass reinforced plastics (FRP). These materials are also commonly referred to as sheet or bulk molding compound (SMC, BMC).

U.S. Pat. Nos. 4,923,756 and 5,002,806 relate to two-component primeness polyurethane adhesives used to bond FRP and SMC. Urethane adhesives are preferred to other adhesives because of outstanding characteristics such as being primerless, non-sagging on vertical surfaces, optional long open-times, flexibility, shock and impact resistance, and high bond strengths.

Typically, two-component polyurethane adhesives are prepared by combining a polyisocyanate prepolymer with a curative component just before applying the mixture to a first substrate. A second substrate is placed over the adhesive and then the laminated part is cured at 300° F. (149° C.) for 30 minutes.

Since adhesives may be applied to substrates in a vertical position, sag resistance is preferred. This property is known as "non-sag" and is measured as the distance the adhesive flows during a certain time period; such as three minutes. ASTM D2202-84 is the test method used to measure sag.

It is important that the adhesive remain partially uncured and fluid for a sufficient amount of time to permit placing the second substrate on to the adhesive and acquiring sufficient wet-out necessary for good adhesion. The length of time the adhesive remains fluid is referred to as the "open time".

In addition to being primerless, other advances in polyurethane adhesives include enhanced adhesion and reduced moisture sensitivity. This is done by including specific additional compounds. U.S. Pat. Nos. 5,175,228 and 5,340,901 relate to two-component, primeness polyurethane adhesives which contain phosphorus-type adhesion promoters. In both references, the urethane prepolymer component contains a large excess of free isocyanate, while the curative component contains a polyol curing agent, an amine sag resistant agent, and an organic phosphorous compound.

Conventional urethane adhesives are known to have foaming problems, especially when bonding in high humidity environments or when the substrate surface is contaminated with moisture. This often results in weaker bonds. U.S. Pat. No. 4,728,710 relates to an improved anti-foaming two-component polyurethane adhesive containing a polyisocyanate prepolymer component and a curative component composed of a polyol, a polyamine, and a bicyclic amide acetal. Foaming at the adhesive / substrate interface, which was probably caused by the reaction of isocyanates with moisture, was reduced or eliminated due to the fast reaction between bicyclic amide acetal compounds and moisture.

European Patent 0,149,765, Canadian Patent 2,120,860 A1 and U.S. Pat. Nos. 3,932,357, 4,108,842, 5,288,797 and 5,412,056 relate to one and two-component urethane coatings and films comprising a polyisocyanate prepolymer component and optionally a curative component composed of ketimines/aldimines and optionally amines. The imine compounds react with moisture in the air forming carbonyl compounds (typically low molecular weight volatile organic compounds) and amine compounds which subsequently react with isocyanates to cure the coating or film. Moisture is usually required to cure, while foaming is eliminated due to the favorable reaction between imines and water.

Ketimines and aldimines of specific structures are also known to react with organic isocyanates as described in Polymer Materials Science and Engineering, vol. 55, pp. 448–457, 1986.

Polyisocyanate and polyurethane components cured with imine compounds have been used as two-component adhesives. German Patent 2,630,013 A1 discloses the use of a polyimine combined with a polyester urethane component for bonding plasticizer-containing polyvinyl chloride. German Patent 4,006,537 A1 relates to a two-component adhesive which is composed of a polyisocyanate prepolymer component and a curative component containing primarily an imine compound. The curative contains a minimum 40% imine-reactive groups, optionally, less favorable compounds such as polyols and polyamines were added up to a maximum of 60% reactive groups. U.S. Pat. No. 4,554,299 relates to an imine used as a curative of an isocyanate/epoxy three-component system.

It would be an improvement in technology if two-component urethane adhesives were primeness and demonstrated consistent enhanced adhesion when bonded in humid as well as dry environments. Imine compounds have been used to eliminate foaming in moisture-cured coatings and to cure isocyanate compounds, but no one has described a curative containing less than 40 weight % of an imine compound used to enhance adhesion and increase moisture resistance of a polyurethane adhesive.

OBJECT OF THE INVENTION

It is therefore an object of this invention to provide a curative for a primeness polyurethane structural adhesive which consistently gives good adhesion when used to bond SMC, preferably hydroxy(meth)acrylate modified SMC, in both dry and humid environments. It is a further object of this invention to provide an adhesive which is strong at elevated temperatures. This adhesive should not sag more than 0.5" in either the button sag test or in the bead sag test within a period of three minutes. The open time interval during which the second substrate can be applied should be within a useful period of from 5 to 40 minutes.

BROAD STATEMENT OF THE INVENTION

The present invention is a curative component of a primeness polyurethane structural adhesive for fiberglass reinforced polyester (FRP) or sheet molding compound (SMC) and other reinforced plastic substrates or metal.

The curative of this invention is used in conjunction with a conventional isocyanate prepolymer. The polyurethane adhesive formed from this combination demonstrates excellent sag resistance and long open times. After curing at 300° F. (149° C.) for 30 minutes, the adhesive delaminates the SMC substrate in a test such as the lapshear test at 180° F. (82° C.), ASTM method D1002.

The curative of this invention is a mixture of a polyol, a diamine or polyamine, a polyketimine and/or polyaldimine compound, and an optional catalyst. The polyisocyanate prepolymer with which the curative of this invention is used is the reaction product of a polyol and an isocyanate. Among the useful prepolymers are those described in U.S. Pat. No. 4,923,756.

Advantages of the present invention include the elimination of the use of a primer prior to application of a polyurethane adhesive to SMC substrates. Another advantage of this invention is the reduction or elimination of adhesive foaming for substrates bonded in humid environments. Still a further advantage of this invention is bonded SMC having superior bond strengths and fibertear when tested. Yet a further advantage of this invention is the combination system of a specific adhesive and a specific SMC having bond strengths and/or fibertear superior to conventional adhesives and SMC. These and other advantages of the curative and primeness adhesive of the present invention will become readily apparent based upon the disclosure contained herein.

DETAILED DESCRIPTION OF THE INVENTION

The present invention is a polyimine-modified curative best used with a polyisocyanate prepolymer to yield a two-component, primeness structural adhesive. The curative of this invention is a mixture of a polyol, a diamine or polyamine, a diimine or polyimine, an optional urethane catalyst and an optional thickening agent.

The polyol of the curative is a polyether or polyester polyol having functionality of 1.8 to 6.0 and hydroxyl number from 100 to 1200. A polyether polyol of hydroxyl number 200–700 and a functionality range of 3 to 5 is preferred. Among the preferred polyols are: Pluracol PEP 550 polyol, a propoxylated derivative of pentaerythritol having four secondary hydroxyl groups, a hydroxyl number of 450, and a molecular weight of 500 available from BASF Wyandotte Corporation, Parsippany, N.J.; Pluracol TP 440 polyol, a propoxylated derivative of trimethylol propane having three secondary hydroxyl groups, a hydroxyl number of 400, and a molecular weight of 420, also available from BASF Wyandotte Corporation; Fomrez ET-3500 polyol, a propoxylated derivative of glycerol having three secondary hydroxyl groups, a hydroxyl number of 48, and a molecular weight of 3500, also available from BASF Wyandotte Corporation.

The second ingredient of the curative is a diamine or polyamine. Suitable amines include: ethylene diamine, propylene diamine, tetramethylene diamine, pentamethylene diamine, hexamethylene diamine, isophorone diamine, dicyclohexylmethane diamine, cyclohexane diamine, piperazine, amino ethyl piperazine, 2-methylpentamethylene diamine, 1,12-dodecane diamine, bis-hexamethylene diamine, dimethylethylene diamine, diethylethylene diamine, dimethyl propylene diamine, diethyl propylene diamine, pentaethylene hexamine, diethylene triamine, hydrazine, xylylene diamine, m-phenylene diamine, p-phenylene diamine, 4,4'-methylene dianiline, 4,4'-diaminodiphenyl sulfone, piperazine, 2,6-diaminopyridine, 4,4'-methylene bis(orthochloroaniline), diethyltoluene diamine, primary and secondary amine terminated polyethers of 100–10,000 molecular weight having 2–6 functionality, preferably from 2 to 3. Commercial products meeting this description include the Jeffamine compounds from Huntsman Chemical, Conroe, Tex., and Polamine 650 and Polamine 1000 from Polaroid Corporation, Assonet, Mass.

The purpose of the amine groups is to react quickly with isocyanate groups of the prepolymer to produce a polyurea. The polyurea forms a strong hydrogen bonded network which significantly increases the viscosity of the partially cured adhesive and thereby provides sag resistance. The preferred amine is piperazine available from Texaco, Inc., New York, N.Y. From 0.5 to 10.0 parts amine are used in 100 parts curative.

Critical to the present invention is the inclusion of diimines or polyimines in the curative component of a 2-component polyurethane adhesive to enhance adhesion and bond strength, and, to decrease adhesive foaming when bonding in humid conditions. Imine compounds of the curative of this invention have imine functionality >2 and a molecular weight of 100 to 5300, preferred are those which have a functionality of 2 to 3 and a molecular weight of 150 to 750. From 1 to 20 weight % ketimine or aldimine is used in the curative of this invention. More preferably 4 to 10 weight % is used.

The polyimines of this invention are typically prepared from the condensation reaction of an amine or polyamine having ≧1 primary amino groups with an organic ketone an organic aldehyde, optionally in the presence of a solvent such as toluene. Preferred are polyamines having 2 to 3 primary amino groups which are bound to aromatic or preferably aliphatic or cycloaliphatic residues, and having a weight average molecular weight of 31 to 5000, preferably 70 to 450. Primary amine compounds useful in this invention include those represented by the formula

R—(NH$_2$)x where R is a hydrocarbon group, which may also contain oxygen, nitrogen, sulfur or halogen, wherein x is ≧1, preferably 2 to 3.

Suitable amines include: propylamine, isopropylamine, butylamine, cyclohexylamine, ethylene diamine, propylene diamine, tetramethylene diamine, pentamethylene diamine, hexamethylene diamine, isophorone diamine, dicyclohexylmethane diamine, cyclohexane diamine, 1,3-cyclohexane bis(methylamine), 2-methylpentamethylene diamine, 1,12-dodecane diamine, bis-hexamethylene diamine, dimethylethylene diamine, diethylethylene diamine, dimethyl propylene diamine, diethyl propylene diamine, pentaethylene hexamine, diethylene triamine, xylylene diamine, m-phenylene diamine, p-phenylene diamine, 4,4'-methylene dianiline, 4,4'-diaminodiphenyl sulfone, 2,6-diaminopyridine, 4,4'-methylene bis(3-chloroaniline), 4,4'-methylene bis(3-chloro-2,6-diethylaniline), 4,4'-methylene bis(3-chloro-2,5-diethylaniline), 3,3'-diisopropyl4,4'-diaminodiphenylmethane, 3,5,3', 5'-tetraethyl4,4'-diaminodiphenylmethane, 1-methyl-3,5-diethyl-2,4-diaminobenzene, 1-methyl-3,5-diethyl-2,6-diaminobenzene (also known as DETDA or diethyl toluene diamine), di(methylthio) toluene diamine, 1,3,5-triethyl-2,6-diaminobenzene, toluene diamine derivatives containing halogen groups, cyano groups, alkoxy, alkylthio, alkenyl or carbonylic moieties, primary and secondary amine terminated polyethers of 100–10,000 molecular weight having 2–6 functionality, preferably from 2 to 3, and mixtures thereof. Commercial products meeting this description include the Jeffamine compounds from Huntsman Corporation, Conroe, Tex. and Polamine 650 and Polamine 1000 from Polaroid Corporation, Assonet, Mass. The preferred amine intermediates are m-xylylenediamine available from Mitsubishi Gas Chemical Company, Inc., New York, N.Y. and Jeffamine T403 available from Huntsman Corporation, Conroe, Tex. Jeffamine T403 is Poly(oxy (methyl-1,2-ethanediyl), alpha-hydromega-(2- aminomethylethoxy)-, ether with 2-ethyl-2-(hydroxymethyl)-1,3-propanediol (3:1).

Aldehyde and ketone compounds useful in this invention for making polyimines are bound to aromatic or preferably aliphatic or cycloaliphatic residues having a functionality of ≧1, preferably 1, and a molecular weight of about 44 to 10,000, preferably 72 to 114. Aldehyde and ketone compounds useful in this invention include those represented by the formula

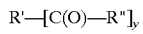

$$R'\text{---}[C(O)\text{---}R'']_y$$

where R' is a hydrocarbon group, which may also contain oxygen, nitrogen, sulfur or halogen, and R" is a hydrogen or a hydrocarbon group, which may also contain oxygen, nitrogen, sulfur or halogen, wherein y is ≧1, preferably 1.

Suitable aldehydes include: formaldehyde, acetaldehyde, propionaldehyde, butyraldehyde, isobutyraldehyde, isovaleraldehyde, 2-methylbutyraldehyde, trimethyl acetaldehyde, valeraldehyde, 3,3-dimethylbutyraldehyde, 2-ethylbutyraldehyde, hexaldehyde, 2-methylvaleraldehyde, 2,3-dimethylvaleraldehyde, heptaldehyde, 2-ethylhexanal, octyl aldehyde, nonyl aldehyde, 3,5,5-trimethyl hexanal, decyl aldehyde, undecylic aldehyde, dodecyl aldehyde, 2-methylundecanal, tridecanal, tetradecyl aldehyde, benzaldehyde, glutaric dialdehyde, isophthalaldehyde, phthalaldehyde, terephthalaldehyde, and mixtures thereof.

Suitable ketones include: acetone, 2-butanone, 3-methyl-2-butanone, 2-pentanone, 3-pentanone, cyclopentanone, cyclopropylmethyl ketone, 2-hexanone, 3-hexanone, 2-methyl-3-pentanone, 3-methyl-2-pentanone, 4-methyl-2-pentanone, 3,3-dimethyl-2-butanone, cyclohexanone, cyclobutylmethyl ketone, 2,4-dimethyl-3-pentanone, 4,4-dimethyl-2-pentanone, 2-heptanone, 3-heptanone, 4-heptanone, 2-methyl-3-hexanone, 5-methyl-2-hexanone, 2-methyl-3-heptanone, 5-methyl-3-heptanone, 2-octanone, 3-octanone, 2-ethoxycyclohexanone, 2,6-dimethyl4-heptanone, 2-nonanone, 3-nonanone, 5-nonanone, 2,2,4,4-tetramethyl-3-pentanone, cyclononanone, 2-decanone, 3-decanone, 4-decanone, 2-undecanone, 6-undecanone, dihexyl ketone, 2-tridecanone, 2-hexadecanone, 1,3-cyclohexane dione, 1,4-cyclohexane dione, poly(vinyl methyl ketone) and mixtures thereof.

The preferred polyimine compound of this invention is the aldimine of isophorone diamine and isobutyraldehyde available from Huls America Inc., Somerset, N.J.

The fourth ingredient of the curative component is an optional catalyst to facilitate the cure of the mixed adhesive. Suitable tertiary amine catalysts include N,N',N"-dimethylaminopropylhexahydrotriazine and 1,4-diazabicycloctane, and suitable metallic catalysts include dibutyltin dilaurate, dibutyltin diacetate, ferric acetylacetonate, nickel acetylacetonate, stannous octoate, dibutyltin diisooctyl mercapto acetate, dibutyltin diisooctyl maleate, and mixtures of these catalysts. Other catalysts such as those described in U.S. Pat. No. 5,175,228 may also facilitate cure, but are not preferred for the present invention. The preferred organo metallic catalyst is dibutyltin diisooctyl maleate catalyst known as DABCO 125 catalyst available from Air Products, Allentown, PA. The preferred tertiary amine catalyst is N,N',N"-dimethylaminopropylhexahydrotriazine known as Polycat 41 catalyst also available from Air Products. Conventional catalytic amounts of either organotin catalyst or tertiary amine catalyst or combinations thereof are optionally used in the curative of this invention. From about 0.01 to 3 parts by weight organotin catalyst and from about 0.05 to 3 parts by weight amine catalyst are optionally used in 100 parts by weight of the curative component.

The preferred optional thickening agents are fumed silica such as Aerosil 200 and Aerosil R972 available from Degussa Inc., New York, N.Y.; Cab-O-Sil TS720 available from Cabot Corporation, Tuscola, Ill.; and Kaofile 2 Thickener, a surface modified kaolinite (aluminum silicate) from Georgia Kaolin Company, Union, N.J. Other thickeners/fillers include but are not limited to carbon black, talc (magnesium silicates), calcium carbonate, calcium silicates, barium sulfates, graphite, or mixtures of fillers.

Small amounts of other optional materials may also be added to the curative. These include coloring agents such as Stantone HCC 6783 green coloring agent from Harwick Chemical Company, Akron, Ohio, which is a blend of C.I. Pigment Green #7 and C.I. Pigment Black #7 dispersed in a polyoxypropylene polyol at 17.8 parts of pigment to 82.2 parts of polyol. Optionally from 1 to 3 parts by weight of an aromatic diisocyanate such as polymethylene polyphenyl isocyanate can be used in 100 parts by weight of the curative component. And, optionally the addition of 0.5 to 5 parts by weight molecular sieves per 100 parts by weight of the curative component.

The prepolymer component is made from the reaction of a polyol and an excess of aromatic polyisocyanate so that free isocyanate groups exist on the ends of the urethane prepolymers and as unreacted polyisocyanates. The prepolymer component optionally contains aliphatic isocyanate and various conventional additives and/or fillers.

The preferred prepolymer component used in combination with the curative of this invention is prepared in the well known manner such as described in U.S. Pat. Nos. 4,552,934 and 4,923,756 where about 100 parts of an active hydrogen containing material having a molecular weight of 400 to 10,000, and preferably from about 1000 to 3500, is reacted with 30 to 120 parts of an organic polyisocyanate preferably in the presence of 5 to 200 parts of an inert powdery filler. Reaction time at elevated temperatures usually is one to several hours. These prepolymers usually have from 3 to 15 percent free isocyanate with 7 to 10 percent free isocyanate being preferred.

The active hydrogen containing material in the prepolymer component of the adhesive may be a polyether polyol, polyester polyol, polycarbonate polyol, polybutadiene polyol, or mixtures of these polyols having a molecular weight of 400 to 10,000, preferably 1000 to 3500, and a functionality of 2 to 4. The preferred polyol is a polypropylene ether diol of 2000 molecular weight.

The isocyanate of the prepolymer component is an aromatic polyisocyanate such as polymethylene polyphenyl isocyanate, 2,4-toluene diisocyanate, 2,4–2,6 (80/20) toluene diisocyanate, 4,4'-diphenylmethane diisocyanate, 1,4-phenylene diisocyanate, 3,3'-dimethoxy4,4'-biphenyl diisocyanate, 3,3'-dimethyl-4,4'-diphenyl methane diisocyanate, or mixtures of these isocyanates.

Also recommended is the inclusion of 0.5 to 6 parts by weight aliphatic isocyanate or mixture of isocyanates with 100 parts combined prepolymer and curative. Among the preferred aliphatic polyfunctional isocyanates are isophorone diisocyanate, bis(4-isocyanatocyclohexyl)methane, m-xylylene diisocyanate, 1,3-bis(isocyanatomethyl) cyclohexane, m-tetramethyl xylene diisocyanate, dimethyl-p-isopropenyl benzyl isocyanate, 1,4-cyclohexane diisocyanate, trimethyl hexamethylene diisocyanate, 2-isocyanatoethyl-2,6-diisocyanatohexanoate, polyurea derivative of 1,6-hexamethylene diisocyanate (Desmodur N 3200), a trimer derivative of 1,6-hexamethylene diisocyanate (Desmodur N-3300) and a low viscosity aliphatic isocyanate (Desmodur KL5-2550).

Further recommended is the use of I to 12 parts by weight of molecular sieves 5A (sodium aluminosilicate). Optional ingredients in the prepolymer component include inert powdery fillers such as aluminum silicates, carbon black, talcs (magnesium silicates), calcium carbonate, calcium silicates, barium sulfates, graphite, or mixtures of fillers. The preferred filler ingredient is talc. Additional optional ingredients such as catalysts and antioxidants may be added as well to the prepolymer component.

The curative and prepolymer components are separately maintained until the customer mixes the two components in the desired ratio, usually 1:1 to 5:1 weight parts of prepolymer to curative. Mixing can be done with a static mixer such as the Model 200 available from $EMC^2$, Sterling Heights, Mich. The adhesive is applied to a first substrate by conventional means. The second substrate is then laminated to the first adhesive coated substrate. The 10 adhesive can be cured by heating the bondline of the laminated material from about 150 to 300° F., preferably about 300° F., for 30 minutes.

The adhesive formed from this invention is particularly well suited for use on fiberglass reinforced substrates. These substrates are typically prepared from the combination of an unsaturated polyester, a high molecular weight polyvinyl acetate, polyester, polymethylmethacrylate or polystyrene, styrene, peroxide polymerization initiator and fillers. The unsaturated polyester is usually prepared from the reaction of diols and maleic anhydride. Adding 4 to 10 parts by weight hydroxyl (meth)acryl ate to 100 parts unsaturated polyester resin provides substrates which bond especially well with the curative and prepolymer of this invention.

This adhesive is also well adaptable for use on a variety of other substrates such as metals, reaction injection molding (RIM), bulk molding compound (BMC) and other plastics. Among the useful fibers used in reinforcing substrates are glass, carbon and kevlar polyamide fibers.

Among the fiberglass reinforced polyester substrates useful in the practice of this invention are those made from PHASE ALPHA, BETA, and EPSILON resins provided by Ashland Chemical, Dublin, Ohio, Cambridge Industries, previously Diversitech General, Marion, Ind. (GT-7113, GT-8002 and GT-7101), Rockwell International Corporation, Centralia, Ill. (RW 9468) and Budd Company, Madison Heights, Michigan (DSM 950).

Another important aspect of the present invention is the use of the curative of this invention with a prepolymer component to adhere a Class "A" SMC substrate which contains 4 to 10 parts by weight, preferably 5 parts by weight, hydroxy(meth)acrylate to 100 parts by weight of unsaturated polyester resin. Class "A" SMC is typically used on the exterior of automobiles and is thus defined as having a premium surface quality, such that the LORIA[1] Index number is <100. The combination of the curative of this invention and the hydroxyl(meth)acrylate modified Class "A" SMC has resulted in bond strengths and/or fibertear superior to conventional adhesives and Class "A" SMC.

[1] Trademark of Diffracto, Canada

The nature and advantage of this invention can be more readily seen and appreciated by reference to the following representative examples where all parts and percentages are by weight unless otherwise indicated. Also, all references cited herein are expressly incorporated herein by reference.

EXAMPLE 1

This example describes the preparation of a diimine from an aliphatic diamine and an aliphatic aldehyde (Aldimine 1).

261 parts by weight of m-xylylenediamine (MXDA) and 75 ml of toluene were charged to a reactor followed by the slow addition of 460 parts of heptaldehyde to control the exotherm to <60° C. After all the heptaldehyde was added, the reaction temperature was increased to 100–125° C. to azeotropically remove water formed from the reaction. The solvent and excess heptaldehyde were removed at 140° C.

EXAMPLE 2

This example describes the preparation of a triimine from an aliphatic triamine and an aromatic aldehyde (Aldimine 2).

400 parts by weight of polyoxypropylenetriamine (Jeffamine T403, Mn ~440) and 75 mL of toluene were charged to a reactor followed by the slow addition of 270 parts of benzaldehyde to control the exotherm to <60° C. After all the benzaldehyde was added, the reaction temperature was increased to 100–130° C. to azeotropically remove water formed from the reaction. The solvent and excess benzaldehyde were removed at 150° C.

EXAMPLE 3

This example describes the preparation of a triimine from an aliphatic triamine and an aliphatic aldehyde (Aldimine 3)

351.4 parts by weight of polyoxypropylenetriamine (Jeffamine T-403, Mn ~440) and 75 mL of toluene were charged to a reactor followed by the slow addition of 252.3 parts of heptaldehyde to control the exotherm to <60° C. After all the heptaldehyde was added, the reaction temperature was increased to 100–125° C. to azeotropically remove water formed from the reaction. The solvent and excess heptaldehyde were removed at 140° C.

EXAMPLE 4

This example describes the preparation of a diimine from an aromatic diamine and an aliphatic aldehyde (Aldimine 4).

133.3 parts by weight of diethyltoluenediamine (Ethacure 100) and 40 mL of toluene were charged to a reactor followed by the slow addition of 175.0 parts of heptaldehyde to control the exotherm to <60° C. After all the heptaldehyde was added, the reaction temperature was increased to 100–125° C. to azeotropically remove water formed from the reaction. The solvent and excess heptaldehyde were removed at 140° C.

EXAMPLE 5

This example describes the preparation of a triimine from an aliphatic triamine and a cycloaliphatic ketone (Ketimine 1).

200.5 parts by weight of polyoxypropylenetriamine (Jeffamine T403, Mn ~440) and 40 mL of toluene were charged to a reactor followed by the addition of 130.5 parts of cyclohexanone; very little exotherm. The reaction temperature was increased to 110–140° C. to azeotropically remove water formed from the reaction. The solvent and excess cyclohexanone were removed at 145° C.

EXAMPLE 6

This example describes the preparation of a commercial prepolymer component useful in the urethane adhesive of this invention.

Formulation

| | |
|---|---|
| Polypropylene ether glycol (MW 2000) | 40.1 |
| Mistron RCS talc | 16.0 |
| Molecular sieves 5A powder | 6.0 |
| Mondur MRS | 12.4 |
| Isonate 2143L | 23.0 |
| Isophorone diisocyanate | 2.4 |
| Zinc stearate | 0.03 |

Mistron RCS talc was added to polypropylene ether glycol (PPG 2000) with adequate agitation to ensure good wetting. The mixture was dehydrated under vacuum at 85–100° C. for 30 minutes. Molecular sieves were added with adequate agitation to ensure good wetting, followed by degassing for 15 minutes or until foaming subsides. The temperature was then stabilized at 60° C. and a mixture of Mondur MRS and Isonate 2143L were added. The components were allowed to react at 80–90° C. until the isocyanate content reached the theoretical value. The mixture was then cooled to 50° C. and Isophorone diisocyanate and zinc stearate were added. The final product was discharged at 35–45° C. and stored under a dry nitrogen atmosphere; viscosity 20,000cps @ 25° C.; 9.8% NCO.

EXAMPLE 7

This example describes the preparation of a curative component of this invention.
Formulation

| | |
|---|---|
| Polyether polyol (MW 550, f = 4) | 72.6 |
| Aerosil 200 | 4.2 |
| Mistron RCS talc | 8.0 |
| Molecular sieves 5A powder | 0.8 |
| Isonate 2143L | 1.7 |
| DABCO 125 | 1.0 |
| Piperazine | 3.4 |
| Aldimine 1 | 8.0 |
| Stantone green dye | 0.3 |

Aerosil 200 and Mistron RCS talc were added to polyether polyol (PEP 550) with adequate agitation to ensure good wetting. The mixture was dehydrated under vacuum at 85–100° C. for 30 minutes. Molecular sieves were added with adequate agitation to ensure good wetting, followed by degassing for 15 minutes or until foaming subsides. The mixture was then cooled to <45° C. and Isonate 2143L was added; DABCO 125 was added after 10 minutes and the vessel temperature was increased to 60° C.; Piperazine was added to the mixture at 60° C. After the piperazine dissolved, the temperature was dropped to 50° C. Aldimine 1 and Stantone green were added to the mixture. The final product was discharged at 35–45° C. and stored under a dry nitrogen atmosphere.

EXAMPLE 8

This example describes the preparation of an imine-modified curative component of this invention
Formulation

| | |
|---|---|
| Polyether polyol (MW 550, f = 4) | 79.1 |
| Aerosil 200 | 3.5 |
| Molecular sieves 5A powder | 0.7 |
| Isonate 2143L | 1.8 |
| DABCO 125 | 0.4 |
| Piperazine | 4.0 |
| Aldimine 2 | 10.0 |
| Stantone green dye | 0.3 |

Aerosil 200 was added to polyether polyol (PEP 550) with adequate agitation to ensure good wetting. The mixture was dehydrated under vacuum at 85–100° C. for 30 minutes. Molecular sieves were added with adequate agitation to ensure good wetting, followed by degassing for 15 minutes or until foaming subsides. The mixture was then cooled to <45° C. and Isonate 2143L was added; DABCO 125 was added after 1 0 minutes and the vessel temperature was increased to 60° C.; Piperazine was added to the mixture at 60° C. After the piperazine dissolved, the temperature was dropped to 50° C. Aldimine 1 and Stantone green were added to the mixture. The final product was discharged at 35–45° C. and stored under a dry nitrogen atmosphere.

EXAMPLE 9

This example describes the preparation of a standard, commercial curative for comparison.
Formulation

| | |
|---|---|
| Polyether polyol (MW 550, f = 4) | 87.9 |
| Aerosil 200 | 5.7 |
| Isonate 2143L | 2.0 |
| DABCO 125 | 0.9 |
| Piperazine | 3.1 |
| Stantone green dye | 0.4 |

Aerosil 200 was added to polyether polyol (PEP 550) with adequate agitation 20 to ensure good wetting. The mixture was dehydrated under vacuum at 85–100° C. for 30 minutes. The mixture was then cooled to <45° C. and Isonate 2143L was added; DABCO 125 was added after 10 minutes and the vessel temperature was increased to 60° C.; Piperazine was added to the mixture at 60° C. After the piperazine dissolved, the temperature was dropped to 50° C. and Stantone green was added. The final product was discharged at 35–45° C. and stored under a dry nitrogen atmosphere.

EXAMPLE 10

This example illustrates the use of the curative of this invention combined with a prepolymer component to adhere SMC substrates.

Three inch by 12-inch plaques of SMC substrate were wiped clean with a dry cloth. Plaques were bonded with an 1-inch overlap prepared by blending the prepolymer of example 6 with the curative of Example 7 in a prepolymer:curative weight ratio of 4.5:1.0. Samples were fixture cured at 135° C. for 2.5 minutes, followed by a postcure at 150° C. for 30 minutes. The bonded plaques were cut into 1" strips to yield lapshear samples with a bonded area of 1"×1"×0.030". Samples were conditioned in an oven at 82° C for 15 minutes and tested on an Instron machine at 0.5"/minute crosshead speed (ASTM method D1002). The results are reported in Table 1.

EXAMPLE 11

This example illustrates the use of a commercial adhesive on SMC substrates.

The commercial adhesive was prepared from the prepolymer of Example 6 with the curative of Example 9 and tested as described in Example 10. Lapshear results are reported in Table 1.

TABLE 1

|  | Invention | Control |
|---|---|---|
| Curative | Example 7 | Example 9 |
| Viscosity | 19,500 | 20,000 |
| Hydroxyl Number | 269 | 353 |
| Amine Value | 73 | 42 |
| Specific Gravity | 1.14 | 1.09 |
| Adhesive properties with prepolymer of Example 6 | Example 10 | Example 11 |
| Mix Ratio, wt | 4.6 | 4.6 |
| Open Time, min | 10 | 8 |
| Button Sag, inch | 0.2 | 0.2 |
| Strength, psi | 2687 | 2983 |
| Elongation, % | 38 | 36 |
| Modulus, ksi | 64 | 84 |
| Lapshear @ 180 F., psi (%FT) | 571(100) | 503 (94) |

Example 10 (averaging 3 tests) shows an aldimine of this invention made in Example 7. The adhesive made with an aldimine containing curative had 68 pounds greater lapshear and 100% fibertear in an adhesive providing superior lapshear strength and percent fibertear to the commercial control adhesive made in Example 9 and tested in Example 11.

EXAMPLE 12

This example illustrates the use of polyimine-modified curatives to provide the urethane adhesives of this invention.

A number of imine compounds were formulated into curative components at 0.1–20 wt % as demonstrated in Examples 7 and 8. The imine-modified adhesives were prepared and tested as described in Example 10. Lapshear results are reported in Table 2.

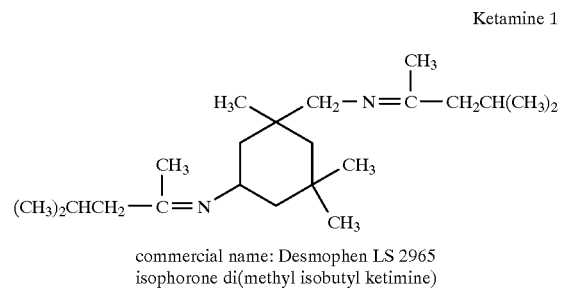

commercial name: Desmophen LS 2965
isophorone di(methyl isobutyl ketimine)

The Examples show imine-modified curatives of this invention provide excellent physical and adhesion properties for SMC bonded to SMC.

EXAMPLE 13

This example illustrates the use of imine-modified, urethane structural adhesives to provide outstanding adhesion in dry as well as humid environments. Imine-modified and commercial control adhesives, prepared as in Examples 10 and 11, were used to bond SMC plaques at varied levels of humidity. Lapshear results are reported in Table 3.

TABLE 3

|  |  | 180 F. Lapshear strengths (%FT) | |
|---|---|---|---|
| Run # | Bonding Humidity | Example 10 Imine Curative | Example 11 Commercial Control Curative |
| 1 | 52 | 514(100) | 383(64) |
| 2 | 53 | 549(96) | 442(62) |
| 3 | 53 | 508(100) | 369(50) |

TABLE 2

| Curative | Aldimine 1 | Aldimine 2 | Aldimine 2 | Aldimine 2 | Aldimine 3 | Aldimine 3 | Aldimine 4 | Ketimine 1 | Vestamin A 139* |
|---|---|---|---|---|---|---|---|---|---|
| Polyol (PEP 550), % | 77.3 | 84.6 | 79.1 | 70 | 76.9 | 72.6 | 72.2 | 72 | 78.5 |
| Aerosil 200/R972, % | 4.2 | 3.7 | 3.5 | 3.5 | 3.3 | 4.2 | 4.2 | 3 | 4.5 |
| Mistron RCS talc | 8 |  |  |  | 7.9 | 8 | 7.9 | 7.9 |  |
| Molecular sieves 5A, % | 0.8 | 0.7 | 0.67 | 0.7 | 1 | 0.8 | 1 | 1 | 1.5 |
| Isonate 2143L, % | 1 | 1.75 | 1.8 | 1 | 1.3 | 1.7 | 1.1 | 1.3 | 1.9 |
| Piperazine | 3.45 | 3.5 | 3.95 | 4 | 3.4 | 3.4 | 4.3 | 3.4 | 3.2 |
| Stan Tone 6783, % | 0.3 | 0.3 | 0.3 | 0.3 | 0.3 | 0.3 | 0.4 | 0.2 | 0.4 |
| DABCO-125, % | 0.95 | 0.5 | 0.39 | 0.3 | 1 | 1 | 1 | 1 | 2 |
| Imine, % | 4 | 5 | 10 | 20 | 5 | 10 | 8 | 10 | 10 |
| Viscosity | 19,600 | 13,400 | 15,800 | 10,600 | 21,800 | 14,200 | nt | 14,800 | 15,000 |
| Hydroxyl Number | 300 | 328 | 332 | 247 | 295 | 255 | 290 | nt | 346 |
| Amine Value | 58 | 55.9 | 75.1 | 105 | 55.1 | 68.8 | 79.1 | nt | 82 |
| Specific Gravity | 1.14 | 1.09 | 1.09 | 1.08 | 1.13 | nt | nt | nt | nt |
| Adhesive properties with prepolymer of Example 6 |  |  |  |  |  |  |  |  |  |
| Mix Ratio, wt | 4.52 | 4.6 | 4.57 | 4.71 | 4.54 | 4.65 | 4.51 | 4.54 | 4.6 |
| Open Time, min | 6 | 10 | 7 | 11 | 5 | 7 | 5 | 5 | 7 |
| Button Sag, inch | 0.1 | 0.3 | 0.2 | 0.2 | 0.1 | 0.1 | 0.2 | 0.3 | 0.3 |
| Strength, psi | 3074 | 3051 | 2827 | 2663 | 2990 | 2558 | 2738 | 2898 | 3381 |
| Elongation, % | 43 | 46 | 42 | 58 | 38 | 30 | 32 | 30 | 46 |
| Modulus, ksi | 82 | 78 | 55 | 32 | 85 | 65 | 67 | 80 | 48 |
| Lapshear @ 180F., psi (% FT) | 556 (100) | 533 (94) | 512 (100) | 508 (98) | 569 (94) | 542 (100) | 548 (100) | 474 (100) | 533 (99) |

*aldimine of isophorone diamine and isobutyraldehyde; available from Huls America Inc.
nt — not tested TABLE 3-continued

|  |  | 180 F. Lapshear strengths (%FT) | |
|---|---|---|---|
| Run # | Bonding Humidity | Example 10 Imine Curative | Example 11 Commercial Control Curative |
| 4 | 42 | 573(100) | 404(59) |
| 5 | 47 | 464(98) | 377(46) |
| 6 | 42 | 504(100) | 480(100) |
| 7 | 42 | 520(109) | 503(91) |
| Average |  | 519(99) | 422(67) |

The Example 10 curative of this invention provides consistently higher adhesive lapshear values than the commercial control adhesives when bonding in both low and high humidity environments.

We claim:

1. A laminated vehicle part comprising two substrates made of sheet molding compound adhered together with the dried residue of an adhesive comprising an isocyanate terminated prepolymer and a curative mixture of a polyol, polyamine, and less 1 to 20% by weight of a polyketimine or polyaldimine, said mixture lacking solvent and having greater than 8000 viscosity at 25 degrees C.

2. The part of claim 1 wherein said polyaldimine is made by condensation with water cleavage from diethyl toluene diamine and heptaldehyde.

3. The part of claim 1 wherein said polyaldimine is made by condensation with water cleavage from m-xylylenediamine and heptaldehyde.

4. The part of claim 1 wherein said polyaldimine is made by condensation with water cleavage from trimethylol propane tris ether and benzaldehyde.

5. The part of claim 1 wherein said polyaldimine is made by condensation with water cleavage from trimethylol propane tris ether and heptaldehyde.

6. The part of claim 1 wherein said polyketimine is made by condensation with water cleavage from trimethylol propane tris ether and cyclohexanone.

7. The part of claim 1 wherein said curative comprises 5 to 10% by weight polyketimine or polyaldimine.

8. The part of claim 1 wherein said adhesive comprises the reactive mole ratio of 0.25–1.5 isocyanate groups: 0.24–0.66 hydroxyl groups: 0.03–0.08 amine groups: 0.01–0.15 imine groups.

9. The part of claim 1 wherein said polyaldimine is the aldimine of isophorone diamine and isobutyraldehyde and said polyketimine is the ketimine of isophorone diamine and methyl isobutyl ketone.

* * * * *